Feb. 27, 1951 J. C. HOWELL 2,543,408
WRIST BAND FOR WATCHES AND THE LIKE
Filed Aug. 19, 1949 4 Sheets-Sheet 1

INVENTOR
JOSEPH C. HOWELL
BY Clark & Ott
ATTORNEYS

Feb. 27, 1951 J. C. HOWELL 2,543,408
WRIST BAND FOR WATCHES AND THE LIKE
Filed Aug. 19, 1949 4 Sheets-Sheet 2
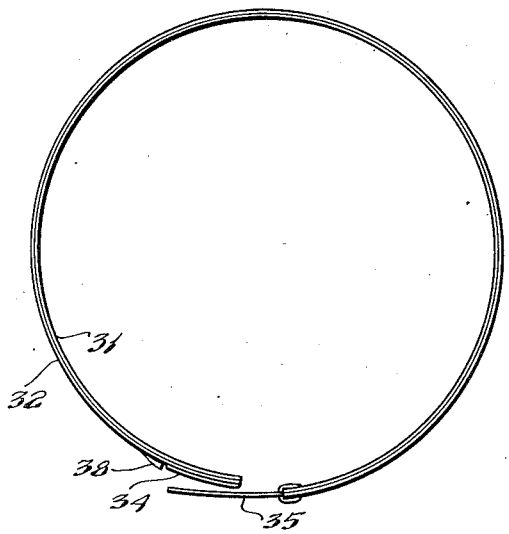
Fig. 7.
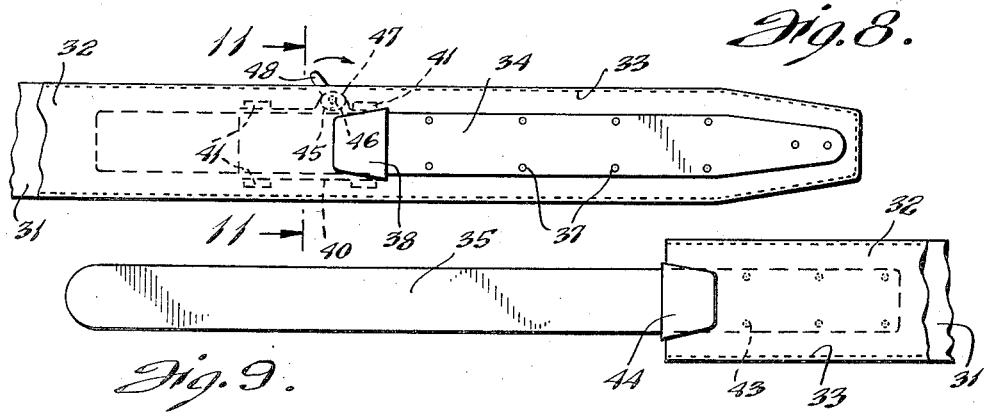
Fig. 8.
Fig. 9.
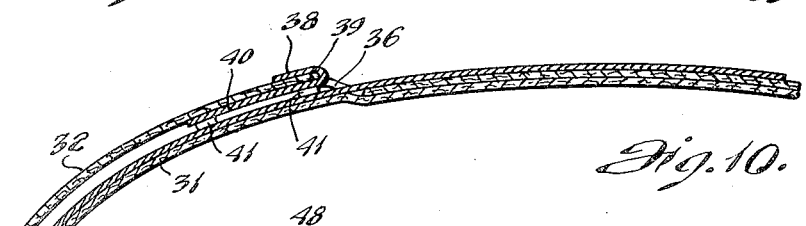
Fig. 10.
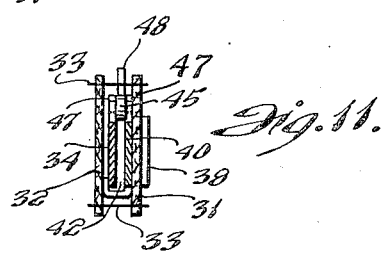
Fig. 11.
INVENTOR
JOSEPH C. HOWELL
BY
Clark & Ott
ATTORNEYS Feb. 27, 1951 J. C. HOWELL 2,543,408
WRIST BAND FOR WATCHES AND THE LIKE
Filed Aug. 19, 1949 4 Sheets-Sheet 3

INVENTOR
JOSEPH C. HOWELL
BY
Clark & Ott
ATTORNEYS

Feb. 27, 1951 J. C. HOWELL 2,543,408
WRIST BAND FOR WATCHES AND THE LIKE
Filed Aug. 19, 1949 4 Sheets-Sheet 4
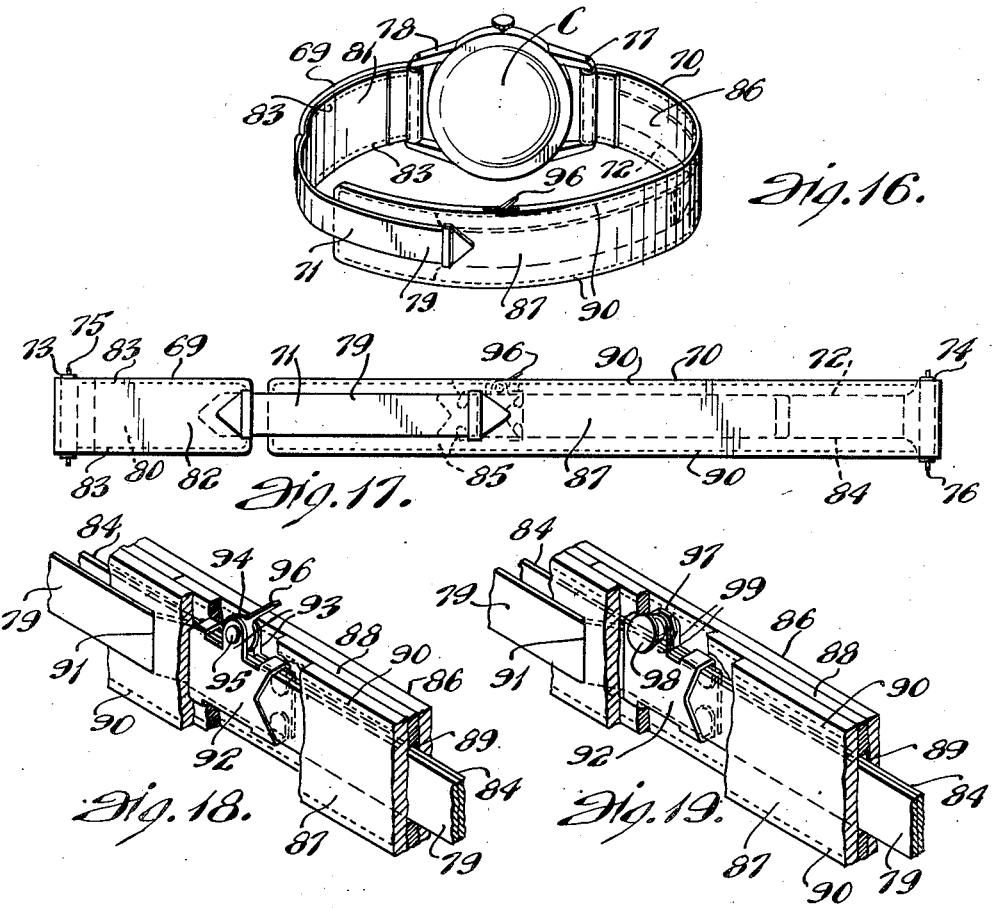
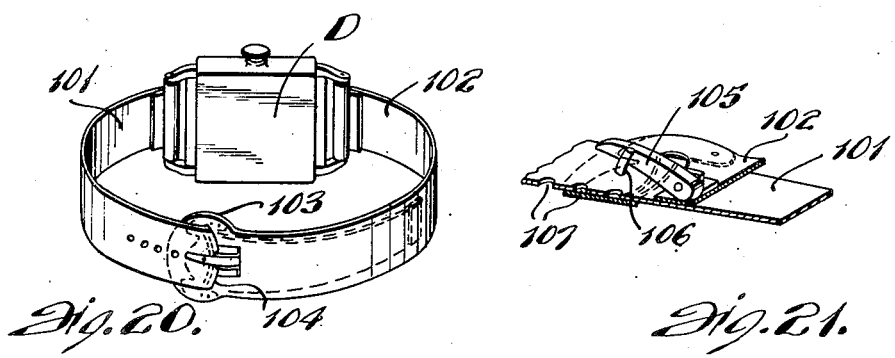
INVENTOR
JOSEPH C. HOWELL
BY Clark & Ott
ATTORNEYS Patented Feb. 27, 1951

2,543,408

UNITED STATES PATENT OFFICE 2,543,408

WRISTBAND FOR WATCHES AND THE LIKE

Joseph C. Howell, Fort Lee, N. J.

Application August 19, 1949, Serial No. 111,155

6 Claims. (Cl. 224—4)

This invention relates to bands such as wrist bands, bracelets and the like and the invention has particular reference to an improved construction for connecting the end portions of the bands together in tightened relation.

The invention has in view a band having flat spring metal ends trained through a tunnel guide in overlapping relation and provided with a locking device for preventing relative movement of the ends of the bands and for retaining the same in overlapping relation.

Another object of the invention is to provide a band having an improved construction for fastening the ends thereof in overlapping relation which permits of the ready release thereof for expanding the band to remove the same and which is neat and attractive in appearance while limiting the possibility of loss by unintentional or accidental removal thereof.

Still another object of the invention is to provide in a band of the indicated character, a cam locking device adapted to be cammed against the side edges of the overlapping ends of the band for retaining the ends in relative adjusted position.

Another object of the invention is the provision of a cam locking means which may be affixed to one of the ends of the band or slidably arranged on the overlapping ends thereof.

With the foregoing and other objects in view, reference is now made to the following specification and accompanying drawings in which the preferred embodiments of the invention are illustrated:

In the drawings:

Fig. 7 is a plan view illustrating a modified form of the invention and showing the same in its application to a belt.

Fig. 8 is an enlarged view of one end portion of the belt.

Fig. 9 is an enlarged view of the opposite end portion of the belt.

Fig. 10 is a longitudinal sectional view showing the end portions of the belt in engagement.

Fig. 11 is a vertical sectional view taken approximately on line 11—11 of Fig. 8.

Fig. 16 is a perspective view of another modified form of the invention and illustrating the same applied to a wrist watch.

Fig. 17 is an outer face view of the wrist band.

Fig. 18 is an enlarged fragmentary portion of the wrist band which is partially cut away to illustrate the locking device.

Fig. 19 is a similar view with a modified form of thumb member for the locking device.

Fig. 20 is a perspective view of another modified form of the invention.

Fig. 21 is an enlarged fragmentary perspective view of the locking device thereof.

Figure 1:
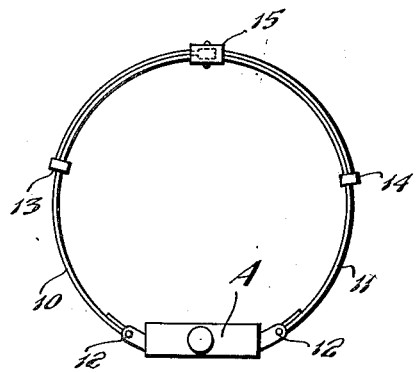
Fig. 1 is a plan view of a band constructed in accordance with the invention and constituting a band for a wrist watch.

Referring to the drawings by characters of reference and more particularly to the form of the invention illustrated in Figs. 1 to 6 inclusive of the drawings which is shown in its application to a band for a wrist watch, the band includes oppositely disposed band members 10 and 11 consisting of elongated strips of flat spring material such as spring metal, whalebone and the like which are formed with pintle rolls at the inner ends thereof through which pintles 12 extend for pivotally connecting the band members to a wrist watch A.

The band members 10 and 11 have their outer end portions arranged in overlapping relation with the extreme ends thereof provided with loops 13 and 14 respectively through which the other band member extends. This permits of the relative sliding of the end portions of the band members with respect to each other for enlarging or constricting the band while preventing relative separation of the band portion from overlapping relation.

In order to retain the band members in overlapped relation against relative movement, a locking device is provided which consists of a tunnel guide 15 of U-shaped formation in vertical section and having a cam element 16 pivoted between the opposite side walls 17 and 18 thereof on a cross pin 19 extending through the upper ends of said side walls. The cam element 16 is provided with a finger engaging lever 20 for rocking the cam element in the direction of the arrow shown in Fig. 4 of the drawings so as to impinge the peripheral cam face thereof against the upper edges of the overlapped ends of the band members 10 and 11 on which the locking device is slidably mounted. The band members may be released from locked engagement for enlarging the opening formed by the band members by turning the cam element in a direction opposite to the direction of the arrow shown in Fig. 4 of the drawings.

The said locking device is slidable on the overlapped end portions of the band members 10 and 11 and may be secured in fixed relation thereon in any desired position between the loops 13 and 14.

Figure 5:
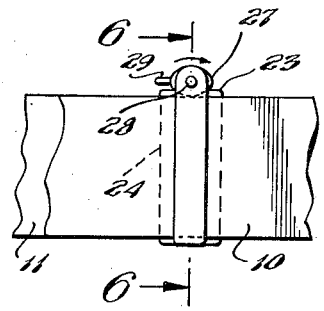
Fig. 5 is a fragmentary side view of a portion of the band illustrating a modified form of latching device.
Figure 2:
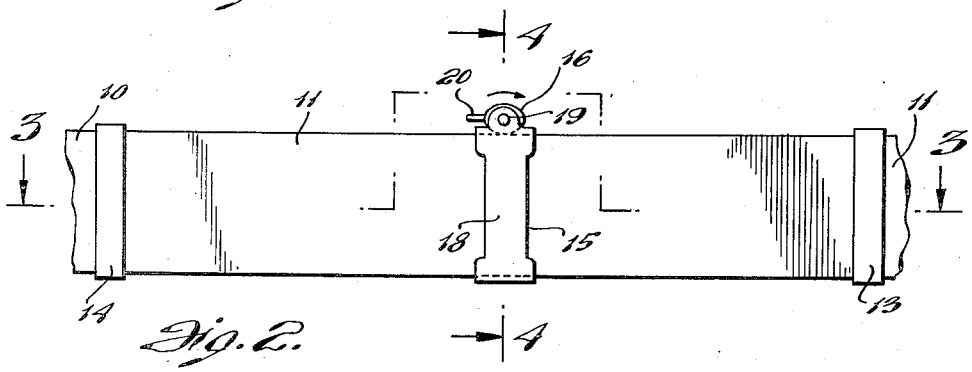
Fig. 2 is an enlarged fragmentary view in elevation thereof.
Figure 3:
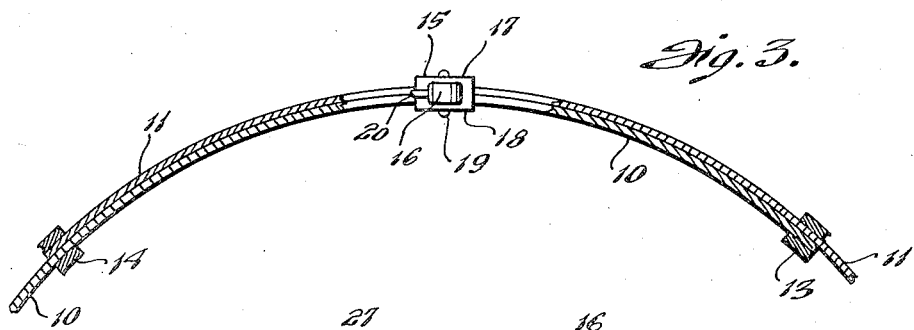
Fig. 3 is a fragmentary horizontal sectional view taken approximately on line 3—3 of Fig. 2.
Figure 6:
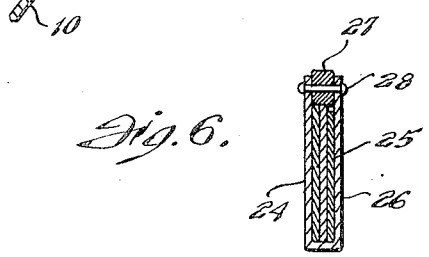
Fig. 6 is a vertical sectional view taken approximately on line 6—6 of Fig. 5.
Figure 4:
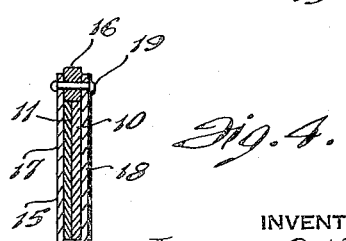
Fig. 4 is a vertical sectional view taken approximately on line 4—4 of Fig. 2.
Figure 12:
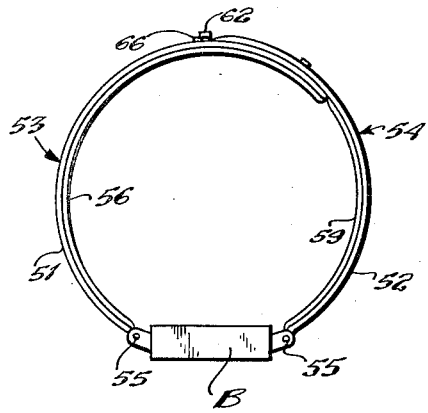
Fig. 12 is a plan view of another modified form of the invention and illustrating the same applied to a wrist watch.
Figure 13:
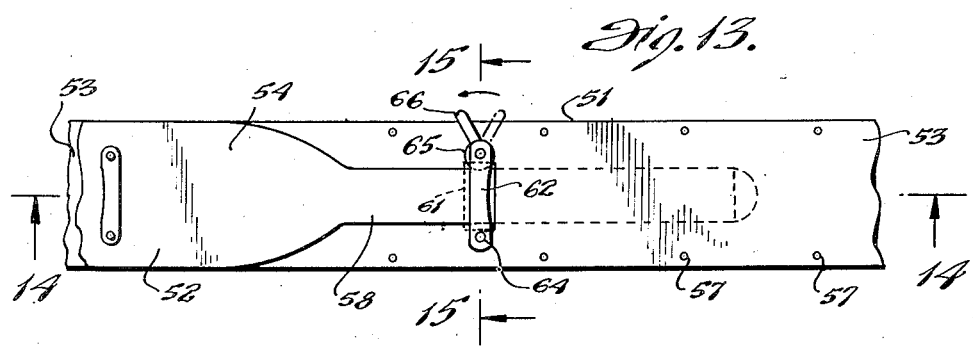
Fig. 13 is an enlarged fragmentary view in elevation thereof.
Figure 14:
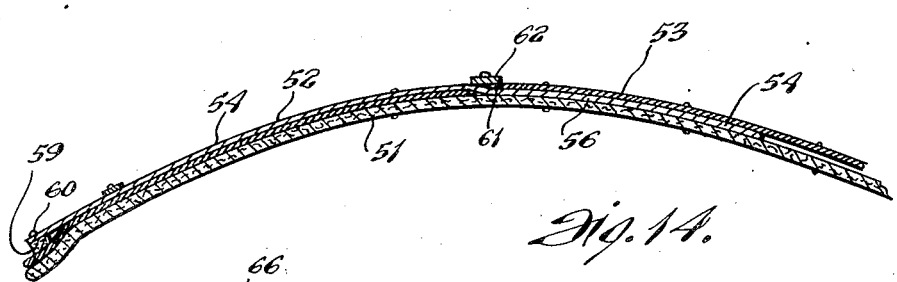
Fig. 14 is a longitudinal sectional view taken approximately on line 14—14 of Fig. 13.
Figure 15:
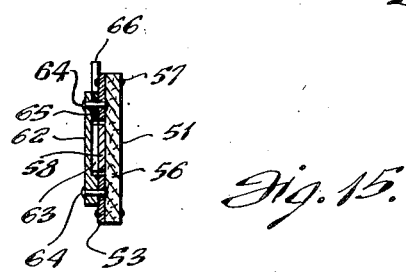
Fig. 15 is a vertical sectional view taken approximately on line 15—15 of Fig. 13.

In place of the said locking device, the band members may be retained against relative movement by means of a locking device 22 shown in Figs. 5 and 6 of the drawings. In this form of locking device the same includes a tunnel guide 23 which is of U-shaped formation and has a side wall 24 welded or otherwise secured to the band member 11 while the end portion of the band member 10 is freely slidable in the tunnel guide between the band member 11 and an auxiliary strip 25 secured to the inner face of the side wall 26.

The band members 10 and 11 are adapted to be secured in overlapped relation against relative movement by means of a cam element 27 pivoted on a cross pin 28 extending through the side walls 24 and 26 to dispose the cam element in overlying relation with the upper edges of the portions of the band members 10 and 11 within the tunnel guide 23. The auxiliary strip 25 is spaced from the cam element 27 so as to provide a clearance therebetween. The cam element 27 is formed with a finger engaging lever 29 for rocking the cam element in the direction of the arrow shown in Fig. 5 of the drawings to impinge the peripheral cam face thereof against the overlapped ends of the band members for retaining the same in fixed relation.

In Figs. 7 to 11 inclusive of the drawings, the invention is illustrated in its application to a belt which includes inner and outer elongated strips or plies 31 and 32 of leather or equivalent flexible material. The strips or plies 31 and 32 are secured together by lines of stitching 33 which extend longitudinally thereof adjacent their upper and lower edges. As in the previous form of the invention, the belt is provided with end portions which are adapted to be disposed in overlapping relation for securing the ends of the belt together in band formation. In this form of the invention the end portions include flat spring strips 34 and 35 which are fashioned of spring metal, whalebone and the like and which are relatively narrower than the belt. The spring strip 34 protrudes through a vertical slot 36 in the outer ply 32 with the outer end portion thereof extending to one end of the belt and secured to the outer face of the outer ply 32 by means of rivets 37 or equivalent fastening means. The inner end portion of said spring strip 34 extends into the belt in overlying relation with the inner face of the inner ply 31. A rebent reinforcing cleat 38 is arranged over the vertical edge portion 39 defining one edge of the slot 36 in the outer ply 32 of the belt with the inwardly extending portion 40 of said cleat arranged against the inner face of the outer ply 32. The cleat 38 is formed with ears 41 projecting outwardly and inwardly from the upper and lower edges of the inwardly extending portion 40 thereof, to which ears the spring strip 34 is welded or otherwise secured to dispose the cleat 38 and the strip 34 in spaced relation so as to provide a tunnel or passageway 42 therebetween which opens through the slot 36.

The spring strip 35 is secured to the other end of the belt between the plies 31 and 32 thereof by rivets 43 or equivalent fastening means with the strip protruding through the end of the belt and through a rebent cleat 44 secured over the end of the belt. The projecting portion of the spring strip 35 is of a size to slidably engage in the slot 36 and the passageway 42 in overlapping relation with the portion of the spring strip 35 located inwardly of the slot 36. A cam element 45 is mounted for rocking movement on a pivot pin 46 journaled in upwardly extending portions 47 formed on the upper edges of the spring strip 34 and the inwardly extending portion 40 of the cleat 38 to dispose the cam element in overlying relation with the upper edge of the spring strip 35 when arranged in the passageway 42. The cam element 45 is provided with a finger engaging lever 48 projecting through the upper edge of the belt between the plies for rocking the cam element in the direction of the arrow indicated in Fig. 8 so as to impinge the cam face thereof against the upper edge of the spring strip 35 to thereby secure the same in relative fixed position and connect the ends of the belt together in band formation.

In the form of the invention illustrated in Figs. 12 to 15 of the drawings, a wrist watch B is provided with oppositely disposed band members 51 and 52 consisting of elongated spring strips 53 and 54 respectively which are fashioned of flat spring material such as spring metal, whalebone and the like and which are provided with pintle rolls at their inner ends through which extend pintles 55 pivotally connecting the band members to the wrist watch B. The spring strip 53 is provided with an inner ply or covering 56 of leather or equivalent material which extends from the pivotal connection of said strip with the wrist watch B to the outer free end thereof and which is secured thereto by rivets 57 adjacent the outer edges of said strip.

The spring strip 54 is somewhat shorter than the spring strip 53 and has its outer end portion reduced in width to provide a narrow spring tongue 58 projecting in prolongation of said strip. The said strip is also provided with an inner ply or covering 59 of leather or equivalent material which extends from the pivotal connection of said strip with the wrist watch B to a point adjacent the tongue 58 and which is secured to the strip by rivets 60 adjacent the edges thereof.

The spring strip 53 is formed with a rectangular slot 61 adjacent the outer end thereof which opens into the band member 51 between the strip 53 and the flexible covering 56. A bar 62 having a recess 63 in its lower face is secured in bridging relation over the slot 61 by rivets 64 to dispose the recess 63 in overlying relation with the slot 61. The recess 63 and slot 61 provide an opening in which the tongue 58 is adapted to be inserted to dispose the inner end of the tongue between the spring strip 53 and the flexible covering 56 of the band member 51. A cam element 65 is mounted for pivotal movement on the uppermost rivet 64 to dispose the peripheral cam face thereof in impinging relation with the upper edge of the spring tongue 58 when engaged in the slot 61 to thereby secure the band members in overlapping relation. The cam element 65 is provided with a finger engaging lever 66 for rocking movement of said lever in the direction of the arrow shown in Fig. 13 of the drawings for rocking the cam element into impinging relation against the spring tongue 58.

In the form of the invention illustrated in Figs. 16 to 19 inclusive of the drawings, a wrist watch C is provided with oppositely disposed band members 69 and 70 which include elongated strips 71 and 72 fashioned of flat spring material and provided with pintle rolls 73 and 74 respectively through which extend pintles 75 and 76 pivotally mounted in bearing openings 77 in the ends 78 of the watch C. The spring strip 71 includes a narrow outer end portion 79 and a relatively wider inner portion 80 extending from the pintle roll 73 to the outer end portion 79. The inner portion 80 is provided with a covering consisting of inner and outer plies 81 and 82 of leather or equivalent material, which plies are secured together by lines of stitching 83 extending therethrough and through openings in the inner portion 80 of said strip adjacent the opposite longitudinal edges thereof with the outer end portion 79 of the strip protruding through the outer end of the covering.

The spring strip 72 includes a narrow portion 84 and a relatively wider portion 85, the narrow portion 84 being connected to the pintle roll 74 at one end and to the relatively wider portion 85 at the opposite end. The said spring strip is provided with a covering consisting of inner and outer plies 86 and 87 extending from the pintle roll 74 to and covering the enlarged portion 85 thereof. Narrow filler strips 88 are arranged between the said plies adjacent the opposite longitudinal edge thereof so as to form a tunnel 89 extending longitudinally of the band member from the pintle roll 74 to the enlarged portion 85 of said spring strip. The said plies are secured in covering relation on the said strip by means of lines of stitching 90 extending therethrough adjacent the opposite longitudinal edges thereof and through openings in the enlarged portion 85 of said spring strip. The outer ply 87 is provided with a slot 91 which opens into the tunnel 89 for receiving the narrow outer end portion 79 of the spring strip 71 in overlying relationship with the narrow end portion 84 of the spring strip 72. This permits of the relative sliding of the narrow end portions of the spring strips with respect to each other for enlarging or constricting the band.

In order to retain the narrow end portions 79 and 84 in adjusted overlying relation, a metallic sheath or guide 92 is arranged in said tunnel through which the end portions 79 and 84 protrude and which is provided with upstanding ears 93 between which a cam 94 is pivoted on a cross pin 95 for rocking movement to dispose the cam face thereof in locking engagement against the upper edges of the end portions 79 and 84. The cam 94 is provided with a lever 96 for rocking the cam into and out of engagement with said end portions. Instead of the cam 94 a cam 97 may be employed as illustrated in Fig. 19 of the drawings having a thumb member 98 affixed to the protruding end of the shaft pivotally mounting the cam on the upwardly projecting ears 99.

In the form of the invention illustrated in Figs. 20 and 21 of the drawings, a wristwatch D is provided with oppositely disposed band members 101 and 102 which are fashioned of flat spring mate- rial. The band member 102 is formed with an enlarged end 103 having an opening 104 therein through which the free end of the band member 101 protrudes with the free end thereof disposed against the inner face of the band member 102. The band member 102 is provided with a lever 105 pivoted thereto for swinging movement and having a downwardly projecting lug 106 adapted to engage in any one of the openings 107 in the band member 101 for retaining the band members against relative movement.

What is claimed is:

1. In a device of the indicated character, oppositely disposed band members having flexible resilient end portions, means carried by one of said end portions adapted to slidably receive the other end portion to dispose the end portions in overlapping relation, a cam element having a peripheral cam face, means pivotally mounting said cam element in overlying relation with the edges of the overlapped end portions of said strips, and a finger engaging lever carried by said cam element for rocking said cam element to impinge said peripheral cam face against the edges of said overlapped end portions for securing the same together in overlapped relation.

2. In a device of the indicated character, oppositely disposed band members having flexible resilient end portions, means carried by one of said end portions adapted to slidably receive the other end portion to dispose the end portions in overlapping relation, a cam element having a peripheral cam face, means pivotally mounting said cam element in overlying relation with the edge of at least one of the overlapped end portions of said strips, and a finger engaging lever carried by said cam element for rocking said cam element to impinge said peripheral cam face against the edge of said end portion for securing the end portions together in overlapped relation.

3. In a device of the indicated character, oppositely disposed band members adapted to be arranged in overlapped relation, one of said band members consisting of inner and outer plies secured together longitudinally thereof adjacent their longitudinal edges and having a slot in the outer ply providing an opening extending into the band between the plies, the other band member having a flexible resilient end portion of reduced width adapted to engage in said slot to dispose the free end portion thereof between the plies of the first mentioned band member, a cam element having a peripheral cam face, means pivotally mounting said cam element in overlying relation with the edge of said flexible reduced end portion when engaged in said slot for rocking movement thereof to dispose said peripheral cam face in impinging relation against the edge of said reduced portion.

4. In a device of the character described, oppositely disposed band members adapted to be arranged in band formation, one of said band members having a flexible resilient tongue projecting outwardly in prolongation thereof and of reduced width, means carried by the other band member slidably receiving said tongue for positioning the same in overlapping relation with said other band member, a cam element having a peripheral cam face, and means pivotally mounting said cam element in overlying relation with a longitudinal edge portion of said tongue when in overlapping relation with the other band member for rocking movement thereof to dispose said peripheral cam face in impinging relation against the edge of said tongue.

5. In a wrist band for a watch, oppositely disposed resilient band members pivotally connected with the watch, one of said band members having a tongue of reduced width projecting outwardly in prolongation thereof, the other of said band members having a portion of reduced width at the pivotal end thereof, a flexible covering enclosing said band members with the covering on one of the band members having a slot through one side face thereof and with the tongue projecting through the covering on the other band member and adapted to extend through said slot to dispose the reduced portions of said band members in overlapping relation, a metallic sheath surrounding said overlapped portions of said band members, and a cam element having a peripheral cam face pivoted to said sheath in overlying relation with the edges of said overlapped portions of the band members for disposing said cam face in impinging relation against the said edges for retaining the band members in overlapped relation.

6. In a wrist band for a watch, oppositely disposed resilient band members pivotally connected with the watch, one of said band members having a tongue of reduced width projecting outwardly in prolongation thereof, the other of said band members having a portion of reduced width at the pivotal end thereof, a flexible covering enclosing said band members with the covering on one of the band members having a slot through one side face thereof and with the tongue projecting through the covering on the other band member and adapted to extend through said slot to dispose the reduced portions of said band members in overlapping relation, a metallic sheath surrounding said overlapped portions of said band members, and a cam element having a peripheral cam face pivoted to said sheath in overlying relation with the edges of said overlapped portions of the band members and having a manipulating end projecting through the covering for moving said cam element to dispose the cam face in impinging relation against the edges of the overlapped portions for retaining the band members in overlapped relation.

JOSEPH C. HOWELL.

REFERENCES CITED

The following references are of record in the file of this patent:

UNITED STATES PATENTS

| Number | Name | Date |
|---|---|---|
| 40,912 | Cowles | Dec. 15, 1863 |
| 291,150 | Chandler | Jan. 1, 1884 |
| 1,135,409 | Simmons | Apr. 13, 1915 |
| 1,339,896 | Kemper | May 11, 1920 |
| 2,186,089 | Baker | Jan. 9, 1940 |
| 2,466,741 | Roehrl | Apr. 12, 1949 |

FOREIGN PATENTS

| Number | Country | Date |
|---|---|---|
| 109,129 | Sweden | Sept. 23, 1943 |
| 217,125 | Great Britain | June 12, 1924 |